(12) United States Patent
Wang et al.

(10) Patent No.: US 11,979,274 B2
(45) Date of Patent: May 7, 2024

(54) NETWORK MANAGEMENT METHOD AND APPARATUS

(71) Applicant: ALIBABA GROUP HOLDING LIMITED, Grand Cayman (KY)

(72) Inventors: Lu Wang, Shanghai (CN); Junjie Cai, Hangzhou (CN); Xu Zeng, Hangzhou (CN); Liangliang Zhu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 303 days.

(21) Appl. No.: 16/729,020

(22) Filed: Dec. 27, 2019

(65) Prior Publication Data

US 2020/0136902 A1 Apr. 30, 2020

Related U.S. Application Data

(63) Continuation of application No. PCT/CN2018/091947, filed on Jun. 20, 2018.

(30) Foreign Application Priority Data

Jun. 27, 2017 (CN) .......................... 201710497841.1

(51) Int. Cl.
*G06F 15/173* (2006.01)
*H04L 9/32* (2006.01)
(Continued)

(52) U.S. Cl.
CPC ........ *H04L 41/0806* (2013.01); *H04L 9/3263* (2013.01); *H04L 12/66* (2013.01);
(Continued)

(58) Field of Classification Search
CPC ... H04L 41/0806; H04L 9/3263; H04L 12/66; H04L 41/12; H04L 63/0876; H04L 67/12;
(Continued)

(56) References Cited

U.S. PATENT DOCUMENTS

2003/0163682 A1* 8/2003 Kleinsteiber ......... H04L 49/357
713/153
2012/0084834 A1* 4/2012 Brown .................. H04W 12/04
709/219

(Continued)

FOREIGN PATENT DOCUMENTS

CN 101442438 A 5/2009
CN 101772053 A 7/2010
(Continued)

OTHER PUBLICATIONS

First Chinese office action issued in corresponding Application No. 201710497841.1, dated Mar. 15, 2021 (6 pages).
(Continued)

*Primary Examiner* — Nicholas P Celani
*Assistant Examiner* — Karina J Garcia-Ching
(74) *Attorney, Agent, or Firm* — Finnegan, Henderson, Farabow, Garrett & Dunner, LLP

(57) ABSTRACT

Embodiments of the present disclosure can provide network management methods and apparatuses, The method can comprise connecting by a first terminal device to a network through a connection mode; and acquiring management configuration information corresponding to the network system.

16 Claims, 14 Drawing Sheets

(51) Int. Cl.
  *H04L 9/40* (2022.01)
  *H04L 12/66* (2006.01)
  *H04L 41/0806* (2022.01)
  *H04L 41/12* (2022.01)
  *H04L 67/12* (2022.01)
  *H04L 67/51* (2022.01)

(52) U.S. Cl.
  CPC .......... *H04L 41/12* (2013.01); *H04L 63/0876* (2013.01); *H04L 67/12* (2013.01); *H04L 67/51* (2022.05)

(58) Field of Classification Search
  CPC . H04L 67/16; H04L 41/0823; H04L 41/0853; H04L 2209/80; H04L 41/08; H04L 67/51; Y04S 40/00; Y04S 40/20; Y04S 40/18
  USPC ........................................................ 709/223
  See application file for complete search history.

(56) References Cited

U.S. PATENT DOCUMENTS

| | | | |
|---|---|---|---|
| 2013/0091288 A1* | 4/2013 | Shalunov | H04W 8/005 709/227 |
| 2014/0250509 A1* | 9/2014 | Ansley | H04W 12/06 709/221 |
| 2017/0033983 A1 | 2/2017 | Caldwell | |
| 2017/0180224 A1 | 6/2017 | Yeo | |

FOREIGN PATENT DOCUMENTS

| | | |
|---|---|---|
| CN | 101951325 A | 1/2011 |
| CN | 102802059 A | 11/2012 |
| CN | 103188107 A | 7/2013 |
| CN | 103222231 A | 7/2013 |
| CN | 104506360 A | 4/2015 |
| CN | 104601589 A | 5/2015 |
| CN | 105450676 A | 3/2016 |
| WO | WO 2006053612 A1 | 5/2006 |
| WO | WO 2019001315 A1 | 1/2019 |

OTHER PUBLICATIONS

International search report and written opinion in International Application No. PCT/CN2018/091947, dated Sep. 18, 2018 (14 pages).

First Chinese Search Report issued in corresponding Chinese Application No. 201710497841.1 dated Mar. 5, 2021 (2 pages).

* cited by examiner

NETWORK MANAGEMENT METHOD AND APPARATUS

CROSS-REFERENCE TO RELATED APPLICATION

The present disclosure claims the benefits of priority to International Application No. PCT/CN2018/091947, filed on Jun. 20, 2018, which claims priority to Chinese Patent Application No. 201710497841.1, filed on Jun. 27, 2017, both of which are incorporated herein by reference in their entireties.

BACKGROUND

There were hundreds of millions of devices connected to the network prior to the era of Internet of Everything. Although that number was very large, when compared with the tens of billions of networking devices in the era of Internet of Everything, there is a huge difference in requirements on device configuration and management. Devices were generally configured and managed one by one prior to the era of Internet of Everything. However, in the era of Internet of Everything, substantially more devices need to be interconnected and connected to the network, such as terminal devices in homes, factories, urban streets, and so on. The costs and waste of time caused by one-by-one configuration and management of the devices is enormous.

For example, kitchen appliances such as a refrigerator and an oven, home devices such as a TV and an air conditioner, a security system, a mobile phone, a tablet computer, a personal computer, and so on can be installed at home. These devices are usually connected to servers of their respective manufacturers, alternatively, by installing Applications (APPs) in a terminal device such as a mobile phone, different devices are managed through their respective APPs.

However, separate networking and management of each device is a waste of time, and devices of different types and structures cannot be managed uniformly, affecting the efficiency of device management.

SUMMARY

Embodiments of the present disclosure provide network management methods and network management devices.

The network management method can comprise connecting by a first terminal device to a network system through a connection mode, and acquiring management configuration information of the network system.

The network management method can comprise: adding, by a server, a terminal device to a network system; and configuring management configuration information for the network system, and sending the management configuration information to the terminal device.

The network management method can comprise: transferring, by a gateway device, device information of a terminal device to a server; and adding the terminal device to a network system, and acquiring management configuration information of the network system provided by the server.

DETAILED DESCRIPTION

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

Figure 1:
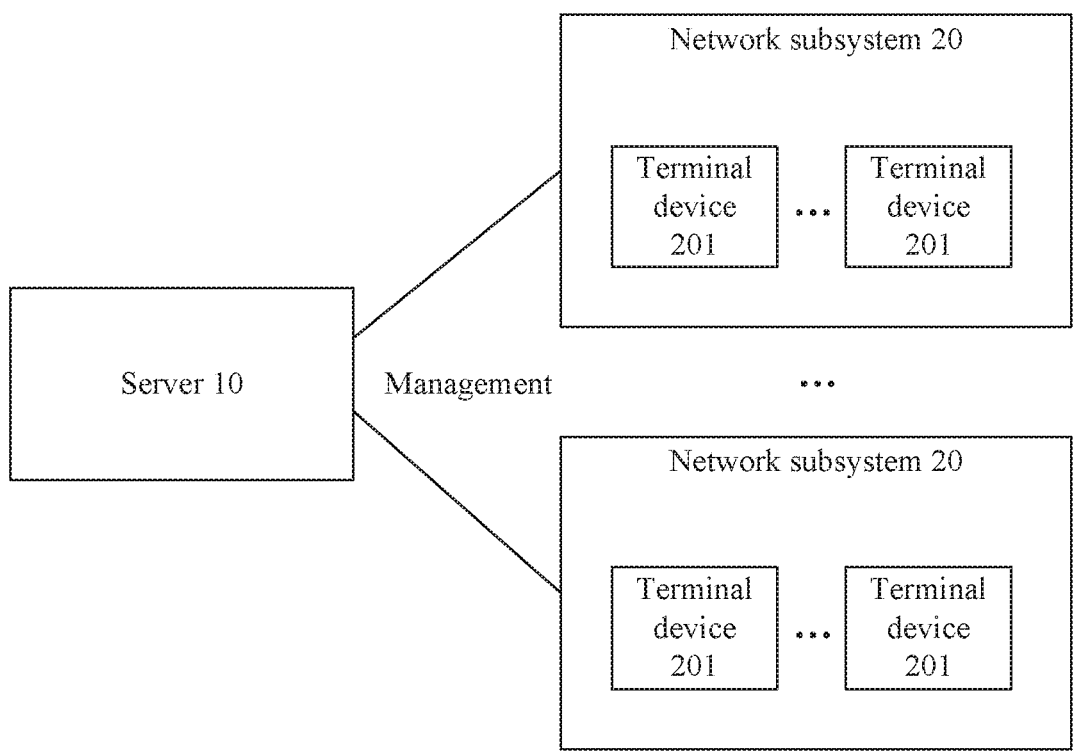
FIG. 1 is a schematic diagram of an exemplary network management system, consistent with some embodiments of the present disclosure.

An exemplary network management system is provided according to some embodiments of the present disclosure. As shown in FIG. 1, the network management system can include a server 10 and at least one network subsystem 20. The network system can serve as a subsystem of the network management system, that is, a local management network of terminal devices. The network subsystem 20 includes at least two terminal devices 201. The server is configured to allocate management configuration information to the terminal devices in the network system. The terminal devices are each configured to be connected to a corresponding network system according to a supported connection mode and acquire the corresponding management configuration information. The terminal devices in the network system can be connected to each other, that is, one terminal device can be connected to another terminal in the network system according to the support connection mode. As such, the terminal devices can form a local management network, e.g., a network system for managing the terminal devices.

The terminal devices can support at least one of functions such as audio, video, and data The terminal devices can be IoT devices such as smart home devices, smart kitchen appliances, and security devices, can also be vehicle-mounted devices, Virtual Reality (VR) devices and so on, and can adopt an operating system such as iOS, Android, and YunOS. The terminal devices in the network system can be different in manufacturers, functions and structure. In some embodiments, the terminal devices can be the same in at least one of the manufacturer, function and structure can also be in the same network system. Thus, based on the network system, the server can manage and configure heterogeneous terminal devices to achieve unified management on a variety of terminal devices.

The server is configured to manage the network system, can also be referred to as a management server and can configure and manage the network system and the terminal devices of the network system. The network system is a local management network formed by at least two terminal devices and is configured to manage local terminal devices. Terminal devices in a network system can be interconnected in one or more connection modes. For example, a device A supports Bluetooth, a device B supports Bluetooth and Wireless-Fidelity (WIFI), and a device C supports a WIFI. Device B can be connected to device A via Bluetooth and connected to the device C via WIFI, and thus the devices can establish a connection using different connection modes and form a corresponding network system (i.e., a local management network). The network system is configured and managed by the server, and thus the terminal devices can acquire management configuration information from the server. The management configuration information is used to store configuration of the terminal devices in the network system and other data, for example, subsystem configuration information such as the name of the network system and a network ID, as well as device configuration information such as device IDs and names of the devices, and interconnected devices, thus implementing the local interconnection of a variety of terminal devices. The unified management of various network systems and their devices is then implemented by the server. The terminal devices update the information automatically and can also send the information to the server to update the corresponding management configuration information.

Some terminal devices support only one connection mode, and some terminal devices can support a plurality of connection modes, while some connection modes do not support communication with a remote server. For example, Bluetooth, as a short-range wireless communication mode, does not support a connection with the remote server. Since the terminal devices of different connection modes are connected with each other, the terminal device that supports the Bluetooth connection can forward data via another connected terminal device, till the data is transmitted to a terminal device that can be connected to the server. The terminal device forwards the data to the server, for example, the terminal device that supports WIFI forwards the data to the server. In the above example, data of the device A can be forwarded to the server by the device B or device C. For example, a terminal device and a server can interact directly in some scenarios, where the terminal device can have some functions of a gateway, such as the capability of performing protocol conversion. In some scenarios, the network system can be provided with a gateway device to transmit data through a network device.

In some embodiments, network management and services of the terminal devices can be separated. The terminal devices can be from different manufacturers and have different functions. Therefore, the terminal devices have respective service processing processes and service systems, e.g., how the terminal devices operate and interact with a service server. A network system can be established separate from the service systems of the terminal devices. The network system is configured to connect and manage a variety of terminal devices and implement the interconnection and management of heterogeneous devices. Therefore, the network system can be separated from services, and service processes of the devices are not affected due to unified management of the devices.

Figure 2:
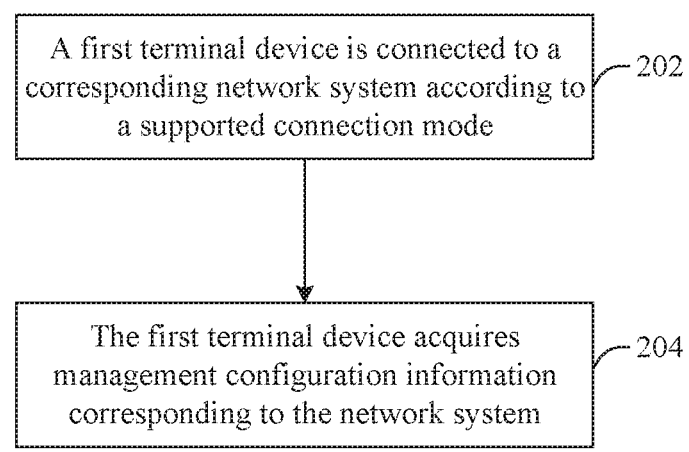
FIG. 2 is a flowchart of an exemplary network management method by a terminal, consistent with some embodiments of the present disclosure.

Referring to FIG. 2, a flowchart of an exemplary network management method at a terminal side consistent with some embodiments of the present disclosure is shown. The method can include the following steps.

In step 202, a first terminal device (e.g., terminal device 201) is connected to a corresponding network system according to a supported connection mode.

In step 204, the first terminal device acquires management configuration information of the corresponding network system.

Figure 3:
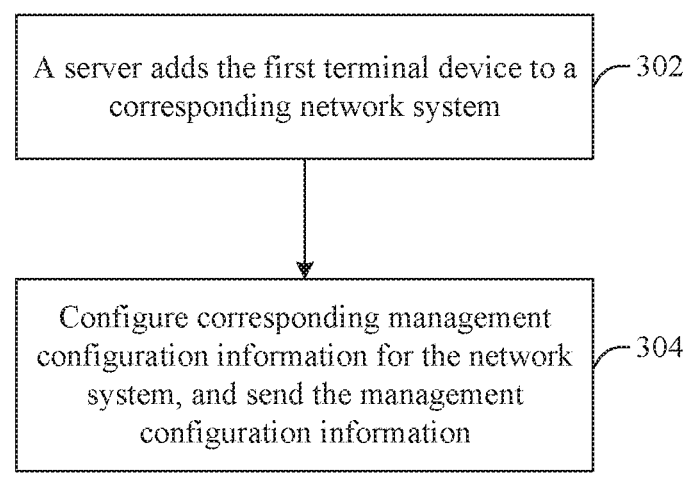
FIG. 3 is a flowchart of an exemplary network management method by a server, consistent with some embodiments of the present disclosure.

Referring to FIG. 3, a flowchart of an exemplary network management method at a server side consistent with some embodiments of the present disclosure is shown. The method can include the following steps.

In step 302, a server (e.g., server 10) adds the first terminal device to a corresponding network system.

In step 304, corresponding management configuration information is configured for the network system, and the management configuration information is sent.

In some embodiments, connecting a first terminal device to a corresponding network system according to a supported connection mode includes: performing scanning for a group of terminal devices, by the first terminal device, according to the supported connection mode, and establishing a connection with a second terminal device selected from the group of terminal devices; and connecting to a network system corresponding to the second terminal device. The terminal device can scan another device in a supported connection mode, for example, by Bluetooth, WIFI or other manners. After one or more terminal devices are found, the first terminal device can select one from the found terminal devices to establish a connection. Then, the first terminal device is connected to a network system corresponding to the second terminal device selected for connection. In some embodiments, two terminal devices with the same connection mode can be identified in other ways, and a connection between the two terminal devices can be established. For example, name, address and other information of one terminal device can be input into another terminal device, and thus the corresponding terminal device is queried based on the name, address and other information and a connection is established. In another example, connection information is marked through a QR code on a terminal device, and another terminal device can establish a connection with the terminal device after scanning the QR code.

The server can add the to-be-connected device to the corresponding network system, then determine corresponding management configuration information, for example, subsystem configuration information such as the name of the network system and a network ID, as well as device configuration information such as device IDs and names of the devices, and interconnected devices, and send the management configuration information to the corresponding terminal device in the network system, i.e., the device that has just been connected to the network system. After acquiring the management configuration information, the terminal device can store the management configuration information and interact with other terminal devices in the network system based on the management configuration information.

The server can store and manage mapping of each local management network, i.e., information of each network system and information of the terminal devices therein, including an ID (e.g., an ID of a local management network) and position information of each network system, as well as configuration information, management information and state information of each terminal device. The management information can include service subscription information. The terminal device can also inform the server after updating, so that the server can update and adjust the corresponding management configuration information of the network system and the terminal device in time.

In some embodiments, the terminal device sends a data request to a server to subscribe to service information according to the data request. The terminal device can request a subscription from the server service by generating a data request. According to the data request, the terminal device can subscribe to desired service information, and can also request and acquire management configuration information, for example, queries address information of another device in the same network system, changes the terminal device's own management configuration information, and so on.

In some embodiments, the terminal device sends authentication information to a server for authentication. Then the server receives device information of the terminal device and performs authentication according to the device information.

A device that has been connected to the network system is referred to as a connected device, and a device that has not been connected to the network system is referred to as a to-be-connected device. For example, if a device found by scanning has been connected to the network system, it can be referred to as a connected device, and if a terminal device has not been connected to the network system and needs to be connected to the subsystem, the terminal device can be referred to as a to-be-connected device. The connected device can acquire device information from the to-be-connected device and send the device information to a server for authentication. The server authenticates the to-be-connected device according to the device information and can add the to-be-connected device to the corresponding network system after the authentication succeeds.

In some embodiments, the server can further establish a network system and configure management configuration information of the network system to manage terminal devices in the network system. An exemplary establishment of a network system can be illustrated as follows.

Figure 4:
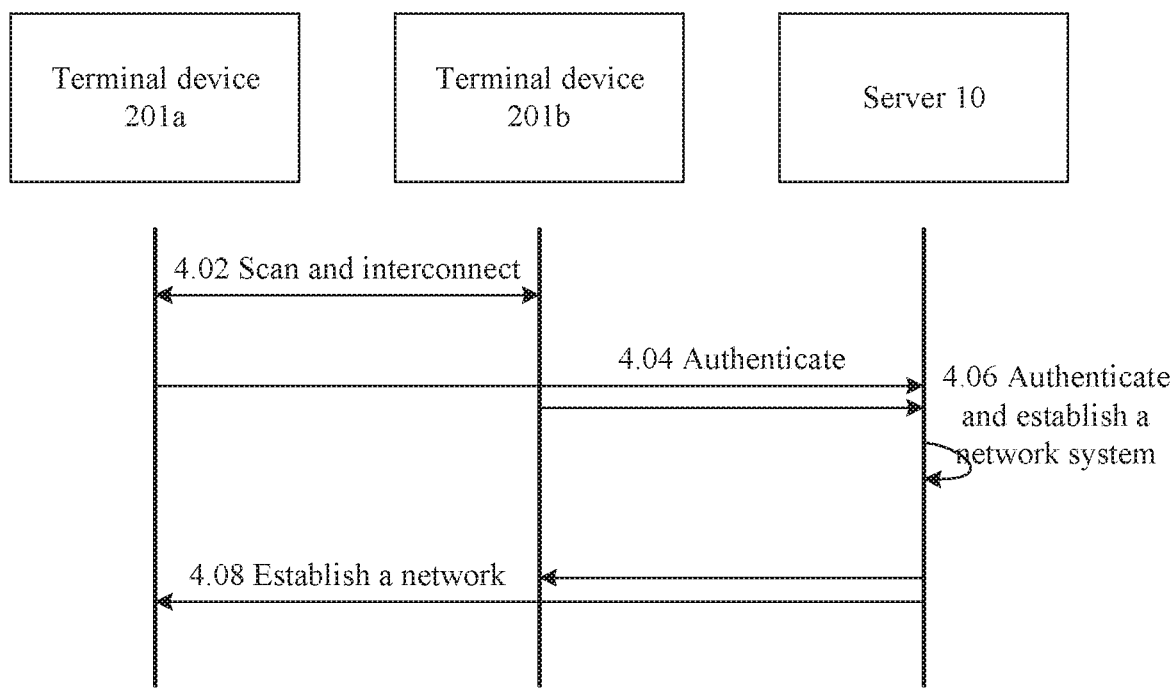
FIG. 4 is a schematic diagram of an exemplary network management process, consistent with some embodiments of the present disclosure.

As shown in FIG. 4, a server 10 can establish and manage a network system between a terminal device 201*a* and a terminal device 201*b*.

In step 4.02, the terminal device 201*a* performs scanning in a supported connection mode and establishes a connection with the terminal device 201*b*. For example, it scans other terminal devices by Bluetooth, WWI or other means.

In step 4.04, the terminal device 201*a* and the terminal device 201*b* send an authentication request to the server 10. The terminal device 201*a* and the terminal device 201*b* can send an authentication request to the server 10 respectively, or the authentication request can be sent by either of the devices.

In step 4.06, the server performs authentication according to the authentication request, establishes a network system of the terminal device 201*a* and the terminal device 201*b* after the authentication succeeds, and returns an establishment result. The establishment result includes management configuration information.

In step 4.08, the terminal device 201*a* and the terminal device 201*b* form the network system according to the establishment result.

In some embodiments, the network system can also be established after more than two terminal devices are connected. After at least two terminal devices are connected, any terminal device capable of interacting with the server can send device information to the server for device authentication. After the authentication succeeds, the server can automatically establish a network system, and the server can also establish a network system based on a request of the terminal device. Thus, establishing a network system can include: after at least two terminal devices establish a connection and succeed in the authentication performed by the server, the server can establish a network system for the at least two terminal devices, and then the server can configure management configuration information of the network system and manage the network system. The network system can be established in a plurality of manners. For another example, each terminal device usually interacts with the server through a gateway device at an output of a switch, a router or the like. Thus, after detecting a new gateway device, the server can establish a corresponding network system for the gateway device. The terminal devices are authenticated through the gateway device and can be added to the network system after the authentication succeeds.

The network system includes at least two terminal devices, each of which can be connected to another terminal device in a supported connection mode. The connection mode includes at least one of the following: Wireless-Fidelity (WIFI), Bluetooth, Zigbee and long-range low-power data transmission (Long Range or LoRa). WIFI is a technology that allows electronic devices to connect to a wireless local area network, e.g., connect the electronic devices to each other. The connection mode of Bluetooth can adopt a Bluetooth Low Energy (BLE) technology. BLE is a low-cost, short-range, interoperable robust wireless technology. The ZigBee is a low-power LAN protocol based on the IEEE802.15.4 standard, which is a short-range low-power wireless communication technology. LoRa is an ultra-long distance wireless transmission scheme based on a spread spectrum technology, characterized in long distance, low power consumption, and low cost for nodes. Thus, local devices can be connected to each other in the above one or more connection modes.

Figure 5:
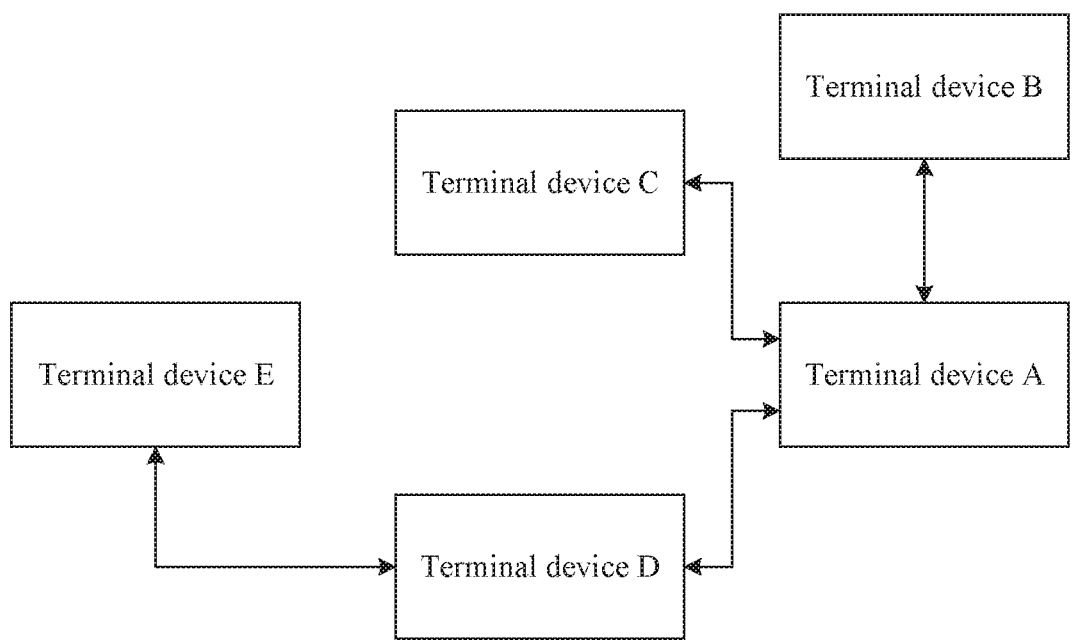
FIG. 5 is a schematic diagram of an exemplary network system, consistent with some embodiments of the present disclosure.

A schematic diagram of an exemplary network system is shown in FIG. 5. The network system includes 5 terminal devices, namely, a terminal device A, a terminal device B, a terminal device C, a terminal device D, and a terminal device E. The terminal device A supports a connection mode of WIFI, the terminal device B supports connection modes of WIFI, BLE, and ZigBee, the terminal device C supports the connection mode of BLE, the terminal device D supports connection modes of ZigBee and LoRa, and the terminal device E supports the connection mode of LoRa. Thus, the terminal device A and the terminal device B are connected to each other in the connection mode of WIFI, the terminal device B and the terminal device C are connected to each other in the connection mode of BLE, the terminal device B and the terminal device D are connected to each other in the connection mode of ZigBee, and the terminal device D and the terminal device E are connected to each other in the connection mode of LoRa. In an example, the terminal device A and the terminal device B can interact with the server. Thus, the terminal device C and the terminal device D are connected to the terminal device B respectively in the connection modes of BLE and ZigBee, then interact with the server through the terminal device A or the terminal device B and acquire management configuration information. Therefore, in some embodiments, when a terminal device in the network system cannot interact with a server, the interaction can be implemented through another terminal device. For example, if the terminal device D is to subscribe to service information X, a request can be sent to the terminal device A, and then the terminal device A forwards the data request to the server. A subscription result of the server is also forwarded by the terminal device A to the terminal device D. Data can be forwarded based on a connection link of the terminal devices in the network system, and the interaction with the server can be implemented.

After the network system is established, a terminal device that has not been connected to the subsystem of the network system (referred to as an unconnected device) can scan and connect to a terminal device that has been connected to the subsystem (referred to as a connected device), then connect to the network system through the connected device, and acquire management configuration information from the server.

There can be a plurality of terminal devices that need to be connected to each other in a variety of environments such as homes and factories. The terminal devices can be connected in a variety of manners, for example, WIFI, BLE, Zigbee, LoRa and other manners. In some embodiments, the terminal devices can be used as nodes for connecting each other based on respective supported connection modes to form a hybrid mesh network. Each connection mode corresponds to one node, so that nodes of different media can be interconnected through the mesh, and a topological network medium of a variety of network media can be better managed. Thus, a variety of media can coexist in the network system, and nodes of different media can be interconnected through the mesh to form a hybrid mesh network independently. As such, a network formed in a variety of connection modes such as WiFi, BLE, Zigbee, and LoRa can be configured and managed.

In some embodiments, the mesh network can coexist with an existing network. For example, in a home network environment, an existing WiFi network still runs the existing service logic. In addition, a WiFi mesh network can coexist and form a management network with the server. A subsystem and a server corresponding to the network can form a network management system, so that nodes in the network can be configured and managed. A business network and a management network can be isolated from each other, so that an impact of the management network on the existing service logic can be avoided The security of network and device management and configuration information can be ensured. The security of the business network can also be restored by re-configuration in case of business network vulnerability. The terminal device can have two co-existing networks and two corresponding network interfaces, i.e., a first interface and a second interface. The first interface is configured to connect to the network system, i.e., connection to the management network, and the second interface is configured to connect to a business network. The two network interfaces can be mapped to the same physical interface or to two physical interfaces.

In some embodiments, service related data can also be transmitted on a link of the mesh network according to a service requirement, so that functions and coverage of the network can be extended.

Figure 6:
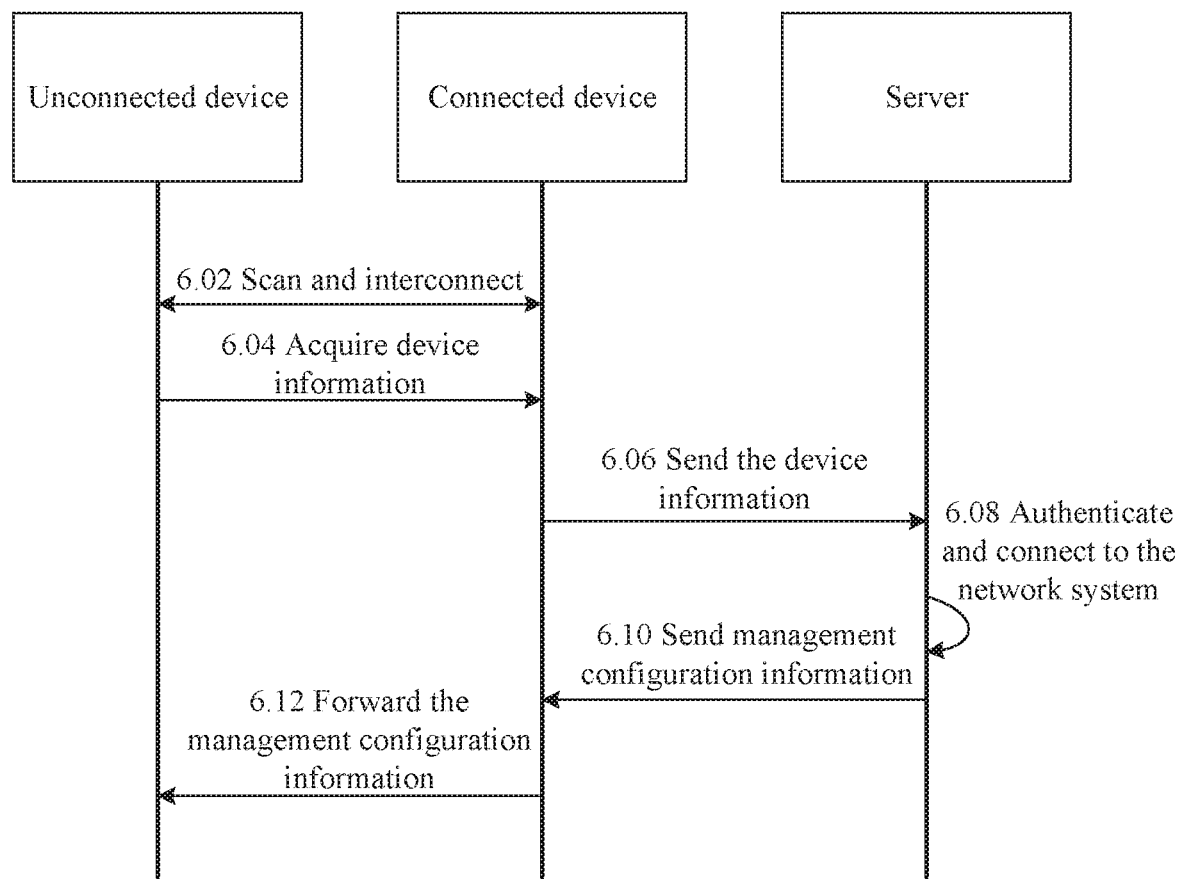
FIG. 6 is a schematic diagram of an exemplary network management process, consistent with some embodiments of the present disclosure.

Referring to FIG. 6, a schematic diagram of an exemplary network management process consistent with some embodiments of the present disclosure is shown.

In step 6.02, an unconnected device is connected to a connected device by scanning. Any of WIFI, BLE, Zigbee, and LoRa can be used in scanning and connection.

In step 6.04, the connected device acquires device information from the unconnected device. The device information can be used for authentication.

In step 6.06, the connected device sends the device information of the unconnected device to a server. Information of the network system corresponding to the connected device can also be included. The server can also query the connected device for the network system of the connected device.

In step 6.08, the server performs authentication based on the device information, and adds the unconnected device to the network system after the authentication has succeeded.

In step 6.10, the server configures device configuration information of the server in the network system and system configuration information of the network system, obtains corresponding management configuration information, and sends the management configuration information to the connected device.

In step 6.12, the connected device acquires the management configuration information, and forwards the management configuration information to the corresponding unconnected device.

A device to be connected to the network system is referred to as an unconnected device, and a device in the network system is referred to as a connected device. The unconnected device can perform scanning based on a supported connection mode, for example, based on at least one mode of WIFI, BLE and Zigbee, identify a connected device by scanning, and establish a connection with the connected device. The connected device can send a request to the unconnected device to acquire the device information of the unconnected device to facilitate authentication.

In some embodiments, the server can authenticate a terminal device, and allow the terminal device that has been authenticated to be added to the corresponding network system. Therefore, after connecting to another terminal device that has been connected to the network, the terminal device sends device information to the server for authentication. The device information is used for device authentication. The device information can include authentication information in addition to a device ID and other device identity information. The authentication information is determined according to a selected authentication mode and encryption information, for example, certificate authentication data, encryption data, signature data and so on. Thus, the encryption information includes a certificate or a key. The unconnected device generates authentication information for authentication according to the encryption information, acquires the device ID, and obtains corresponding device information. Then the device information can be sent to the connected device, the connected device sends the device information to the server, and the server performs authentication according to the device information.

For example, an authentication certificate can be recorded in the terminal device when released from a factory. Correspondingly, the server also stores the authentication certificate of the terminal device, and thus can perform device authentication based on the certificate. The terminal device can also acquire a master key, for example, by generating a master key randomly after scanning a code. Correspondingly, the server also stores the master key, and thus performs device authentication based on the master key.

In some embodiments, the server can perform two-way authentication, for example, using a Datagram Transport Layer Security (DTLS) protocol. The two-way authentication can ensure the authentication of a terminal device with unlimited resources and can also support the authentication of a terminal device with limited bandwidth and processing resources. For example, the terminal device can perform two-way authentication with the server using a certificate or a master key and can be added to the corresponding network system after the authentication has succeeded.

In some embodiments, after the terminal device is added to the network system, the server can push management configuration information to a device node. The management configuration information can include various configuration and management information, such as information that a device needs to subscribe to and a password that the device needs to obtain. The device can also send a service that the device attempts to subscribe to, and management state information to a management cloud. The terminal device can send a request to the server to subscribe to service information, and request acquisition of the management state information. The service information, password data, and management state information can all be used as the management configuration information.

Figure 7:
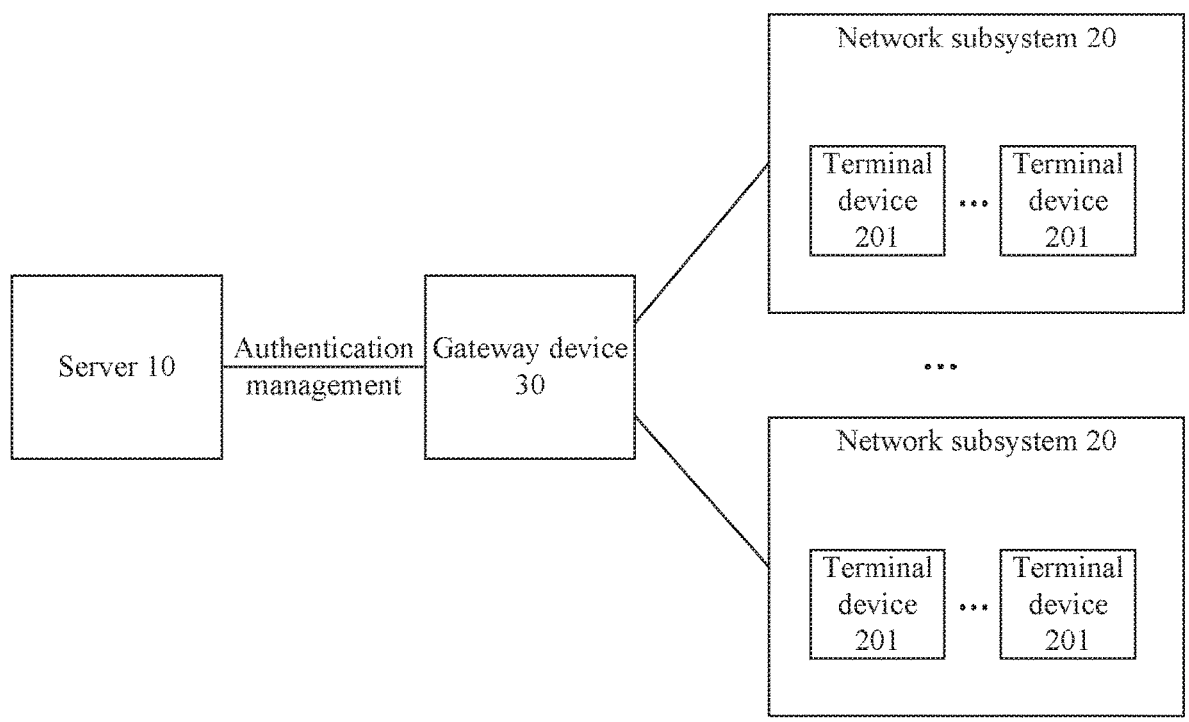
FIG. 7 is a schematic diagram of another exemplary network management system, consistent with some embodiments of the present disclosure.

As shown in FIG. 7, the network management system can include a server 10, at least one gateway device 30, and at least one network subsystem 20. The network subsystem 20 includes at least two terminal devices 201. Each gateway device corresponds to a network system. Each network system can have a gateway node, and thus the gateway node can be used to mark a network system. For example, a terminal device that uses the gateway node for information transfer and authentication can be added to a network system corresponding to the gateway node. The gateway device is configured to connect the server and the network system. Data of the terminal devices in the network system can be forwarded to the server through the gateway device. For example, the gateway device includes a router and a switch. The gateway device can store management configuration information of the network system and record the terminal devices in the network system. For example, a device list of a network system can be maintained in the gateway device 30, which can store information of the terminal devices 201 in the network system, such as device names, IDs, and addresses. Moreover, the gateway device 30 can provide some basic services and configuration management for the network system when the gateway device cannot be connected to the server.

The gateway device 30 and the terminal device 201 can also adjust corresponding configuration information such as an address and an operating system, and can send the adjusted configuration information to the server 10, thus facilitating the server 10 to update the management configuration information. Correspondingly, after automatically updating the management configuration information, the server 10 can also send the updated management configuration information to the terminal device and the gateway device.

Figure 8:
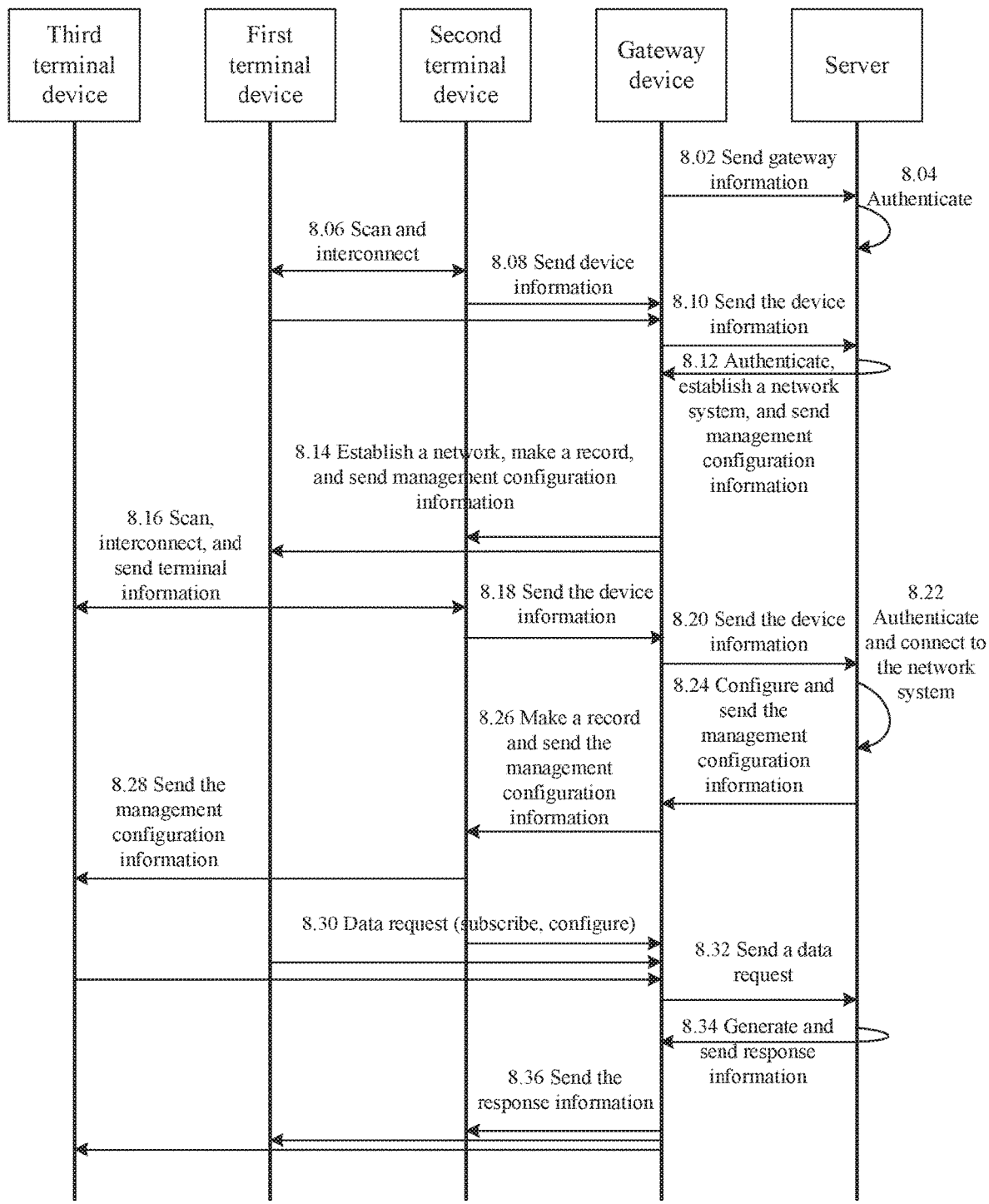
FIG. 8 is a schematic diagram of an exemplary network management process, consistent with some embodiments of the present disclosure.

Referring to FIG. 8, a schematic diagram an exemplary network management process consistent with some embodiments of the present disclosure is shown. In this example, the network management system includes a server, a gateway device and a network system. The network system includes a first terminal device and a second terminal device. The second terminal device is connected to the gateway device via WWI, and the gateway device is further connected to the server. The first terminal device, the second terminal device, and a third terminal device are scanned and connected through at least one of WIFI, BLE, Zigbee, and LoRa.

In step 8.02, the gateway device (e.g., gateway device 30) sends gateway information to the server (e.g., server 10). The gateway information can include a gateway ID, and authentication information to allow the server to perform authentication.

In step 8.04, the server performs authentication according to the gateway information, and feeds back a result indicating successful authentication to the gateway device. In some embodiments, the server can transmit to the gateway device that the authentication has been successful. If the authentication fails, the message from the gateway device can be ignored.

In step 8.06, the first terminal device is connected to the second terminal device by scanning. Any of WIFI, BLE, Zigbee, and LoRa can be used in scanning and connecting.

In step 8.08, at least one of the first terminal device or the second terminal device can acquire device information, and the second terminal device sends the device information to the gateway device. The device information can be used for authentication, and can include a terminal ID, and authentication information.

In step 8.10, the gateway device sends the device information to the server.

In step 8.12, the server performs authentication based on the device information. After the authentication succeeds, the server establishes a management network and a network system corresponding to the gateway device and configures management configuration information.

In step 8.14, the gateway device acquires a result indicating successful authentication, receives the management configuration information, and records the first terminal device and the second terminal device in the network system.

In step 8.16, the third terminal device is connected to the second terminal device by scanning and sends terminal information to the second terminal device.

In step 8.18, the second terminal device sends the device information to the gateway device for connection to the server for authentication through the gateway device.

In step 8.20, the gateway device sends the device information to the server.

In step 8.22, the server performs authentication based on the device information, and after the authentication succeeds, adds the third terminal device to the network system corresponding to the gateway device.

In step 8.24, the server configures device configuration information of the server in the network system and system configuration information of the network system, obtains corresponding management configuration information, and sends the management configuration information to the gateway device.

In step 8.26, the gateway device acquires the result indicating successful authentication, receives the management configuration information, records the third terminal device in the network system, and sends the management configuration information to the second terminal device.

In step 8.28, the second terminal device sends the management configuration information to the third terminal device.

In step 8.30, any of the first terminal device, the second terminal device, and the third terminal device can generate a data request for subscription to a service, query the management configuration information. The data request is sent to the gateway device through the second terminal device.

In step 8.32, the gateway device sends the data request to the server.

In step 8.34, the server subscribes to a service according to the data request, acquires the corresponding management configuration information, generates response information, and returns the response information to the gateway device.

In step 8.36, the gateway device sends the response information to the corresponding first terminal device, second terminal device and third terminal device respectively.

The gateway device can record all terminal devices that are added to the network system and record the management configuration information of the network system fed back by the server. The record can also be stored in the server, and mapping of each network system can be stored in the server, including mapping information such as a gateway device corresponding to a network ID.

The server can also authenticate the gateway device. The gateway device can be authenticated when interacting with the server for the first time. The server continues to communicate with the gateway device after the authentication succeeds. For example, after the terminal devices are connected to each other, server authentication is sent through the gateway device. After the terminal devices have succeeded in the server authentication, a network system corresponding to the gateway device can be established, and corresponding management configuration information is configured. The management configuration information can include mapping information such as a network ID, a gateway device ID, a name, and an MAC address. Also, after the terminal devices have succeeded in the authentication, the terminal devices are added to the network system corresponding to the forwarding gateway device.

After the initial authentication succeeds, a binding relationship can be formed between the gateway device and the terminal devices. When the server transmits the management configuration information to the terminal devices, the gateway device also updates the management configuration information of the network system stored in the gateway device. The management configuration information includes basic information of the network, information of the terminal devices such as server information to which each terminal device correspondingly subscribes and service function data provided by the gateway. Thus, even if the gateway device cannot be connected to a cloud server, the terminal device can still acquire the configuration information of the management network through the gateway device and some network service functions that the gateway device is responsible for. Therefore, the network system can provide limited network access services and limited network services when the gateway device cannot be connected to the server.

It should be noted that for ease of description, the method embodiments are all described as a series of action combinations. However, those skilled in the art will appreciate that the embodiments of this disclosure are not limited to the described sequence of the actions, because some steps can be performed in another sequence or at the same time according to the embodiments of this disclosure. In addition, those skilled in the art will appreciate that the embodiments described in this specification all belong to preferred embodiments, and the actions involved are not necessarily mandatory to the embodiments of this disclosure.

Figure 9:
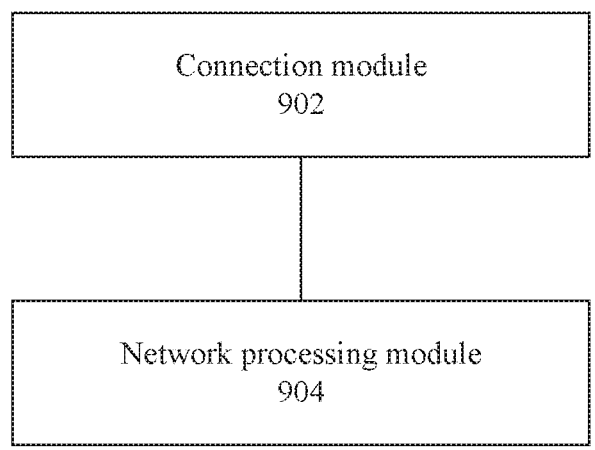
FIG. 9 is a schematic diagram of an exemplary network management apparatus applied on a terminal device, consistent with some embodiments of the present disclosure.

Referring to FIG. 9, a schematic diagram of an exemplary network management apparatus in a terminal device consistent with some embodiments of the present disclosure is shown. The apparatus can include a connection module 902 and a network processing module 904.

Connection module 902 is configured to connect to a corresponding network system according to a supported connection mode.

Network processing module 904 is configured to acquire management configuration information of the network system.

Connection module 902 is configured to perform scanning for other terminal devices through a supported connection mode and select a terminal device among the other terminal devices to establish a connection and connect to a network system corresponding to the connected terminal device. The connection mode includes at least one of the following: WIFI, Bluetooth, Zigbee and LoRa.

Figure 10:
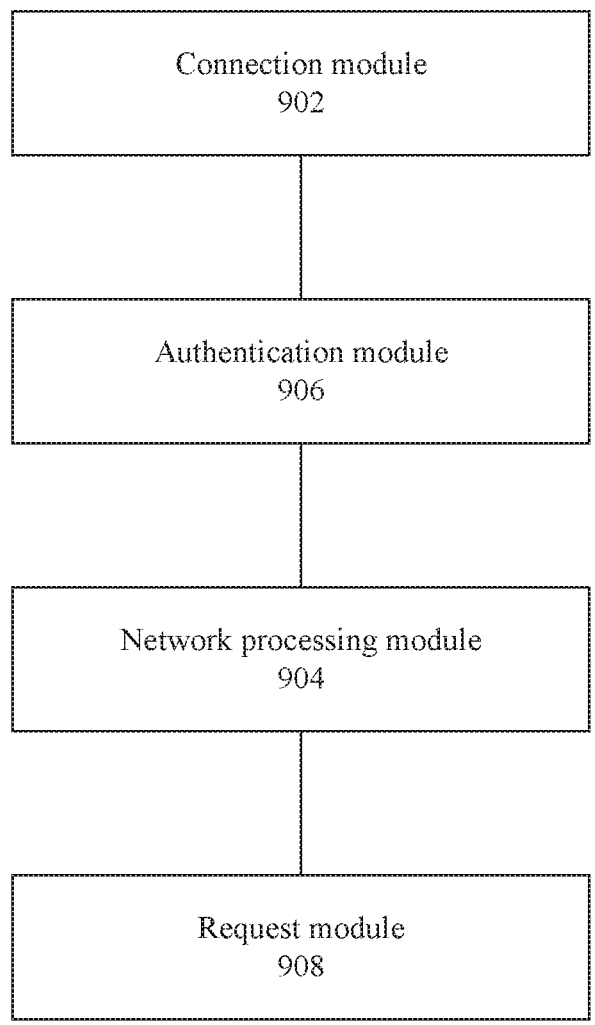
FIG. 10 is a schematic diagram of another exemplary network management apparatus applied on a terminal device, consistent with some embodiments of the present disclosure.

Referring to FIG. 10, a schematic diagram of an exemplary network management apparatus in a terminal device is shown. The apparatus can include a connection module 902, an authentication module 906, a network processing module 904, and a request module 908.

Connection module 902 is configured to be connected to a corresponding network system according to a supported connection mode.

Authentication module 906 is configured to send authentication information to a server for authentication.

Network processing module 904 is configured to acquire management configuration information of the network system.

Request module 908 is configured to send data request to a server to subscribe to service information according to the data request.

Authentication module 906 is configured to determine device information according to encryption information. The encryption information includes a certificate or a key. Authentication module 906 can send the device information to a terminal device interacting with the server to transmit the device information to the server for authentication.

Data between the terminal device and the server is forwarded through a gateway device. The network device includes a first interface and a second interface, the first interface is configured for connection to the network system, and the second interface is configured for connection to a service network.

On the basis of the above embodiments, a network management apparatus applied to a server is further provided in some embodiments. The network management apparatus includes: a gateway management module.

The gateway management module is configured to add the terminal device to a corresponding network system, and configure corresponding management configuration information for the network system and send the management configuration information.

Figure 11:
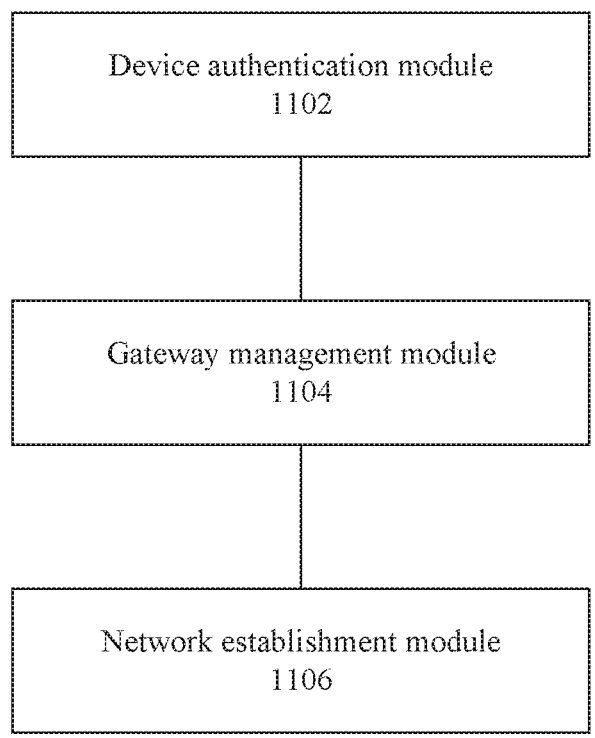
FIG. 11 is a schematic diagram of an exemplary network management apparatus applied on a server, consistent with some embodiments of the present disclosure.

Referring to FIG. 11, a schematic diagram of an exemplary network management apparatus in a server is shown. The apparatus can include a device authentication module 1102, a gateway management module 1104 and a network establishment module 1106.

Device authentication module 1102 is configured to authenticate a terminal device.

Gateway management module 1104 is configured to add the terminal device to a record of a corresponding network system after the authentication succeeds, acquire management configuration information corresponding to the network system and send the management configuration information.

Network establishment module 1106 is configured to establish a network system and configure management configuration information of the network system.

Device authentication module 1102 is configured to receive device information of the terminal device and perform authentication according to the device information. Gateway management module 1104 is configured to add the terminal device to the corresponding record of the network system after the authentication succeeds.

Data between the server and the terminal device is forwarded through a gateway device. Device authentication module 1102 is configured for the server to receive device information from the gateway device and authenticate the corresponding terminal device according to the device information. Gateway management module 1104 is configured to add the terminal device to the network system to which the gateway device belongs after the authentication succeeds.

Gateway management module 1104 is configured to acquire system configuration information of the network system and device configuration information of the terminal device, and generate the management configuration information using the system configuration information and the device configuration information.

Figure 12:
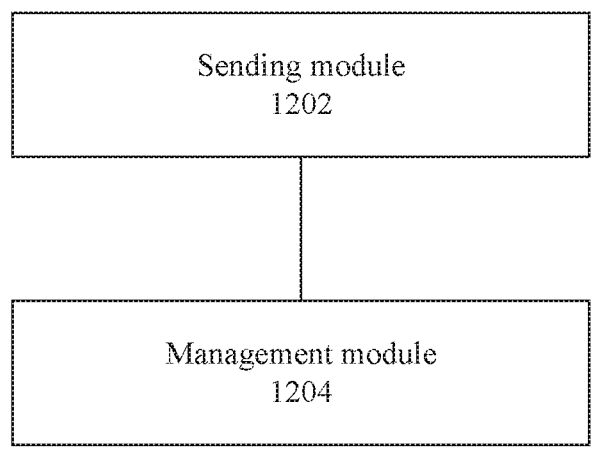
FIG. 12 is a schematic diagram of an exemplary network management apparatus applied on a gateway device, consistent with some embodiments of the present disclosure.

Referring to FIG. 12, a schematic diagram of an exemplary network management apparatus in a gateway device is shown. The apparatus can include a sending module 1202 and a management module 1204.

Sending module 1202 is configured to forward device information of a terminal device to a server.

Management module 1204 is configured to add the terminal device to a corresponding network system and acquire management configuration information of the network system fed back by the server.

Management module 1204 is configured for the gateway device to establish a binding relationship with the terminal device after the authentication succeeds and add the terminal device to a record of the network system to which the terminal device belongs.

Sending module 1202 is further configured to send authentication information to the server for authenticating the gateway device.

Management module 1204 is further configured to provide management configuration information or a network service function for the terminal device in the network system when the gateway device is not connected to the server.

A network management system is provided in some embodiments. The network management system can include a terminal device, a server and a gateway device. The terminal device includes the network management apparatus as described in some embodiments corresponding to FIG. 9 and FIG. 10. The server includes the network management apparatus as described in some embodiments corresponding to FIG. 11. The gateway device includes the network management apparatus as described in some embodiments corresponding to FIG. 12.

A non-volatile readable storage medium is further provided in some embodiments. One or more programs are stored in the storage medium. When applied to a device, the one or more programs cause the device to execute instructions to performed the methods in some embodiments of the present disclosure.

One or more machine readable media with instructions stored thereon are provided in some embodiments. When executed by one or more processors, the instructions cause an electronic device to perform one or more of the methods as described in the above embodiments. The electronic device includes a terminal device, a server and a gateway device.

Figure 13:
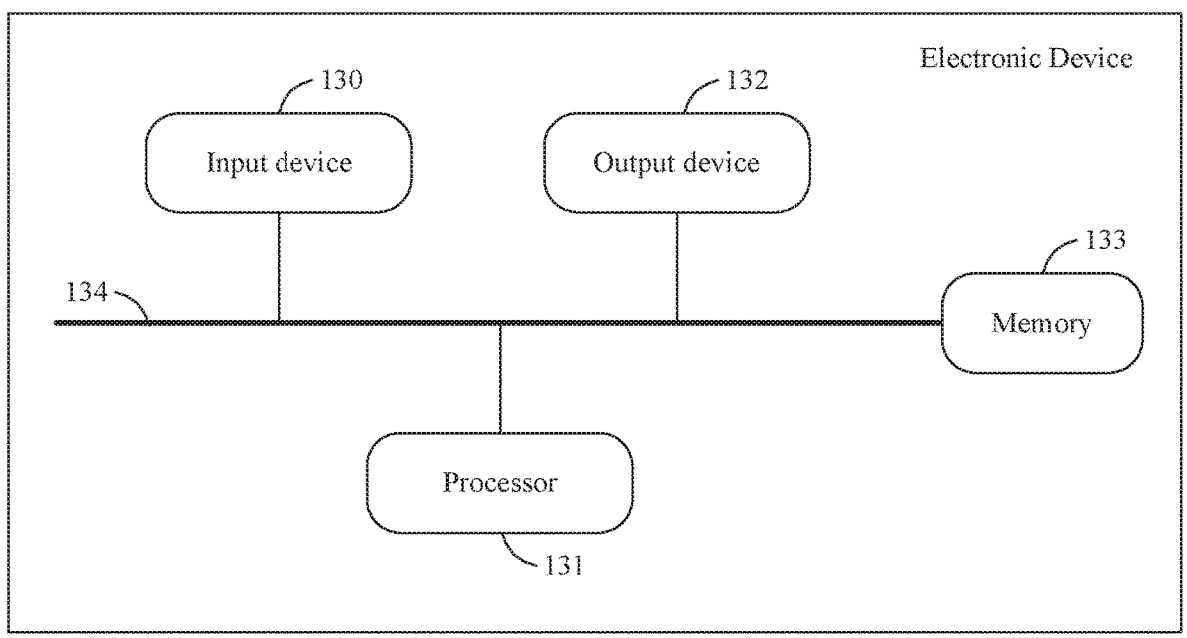
FIG. 13 is a schematic diagram of an exemplary hardware structure of an electronic device, consistent with some embodiments of the present disclosure.

FIG. 13 is a schematic diagram of an exemplary hardware structure of an electronic device consistent with some embodiments of the present disclosure. The electronic device can include a terminal device, a server, and a gateway device. As shown in FIG. 13, the electronic device can include an input device 130, a processor 131, an output device 132, a memory 133, and at least one communication bus 134. Communication bus 134 is configured to implement communication connections between components. Memory 133 can include a high-speed Random Access Memory (RAM), and can also include a nonvolatile storage non-volatile Memory (NVM), such as at least one disk memory. Memory 133 can store a variety of programs for completing a variety of processing functions and implementing the steps of the methods in the embodiments.

In some embodiments, processor 131 can be one or more of, for example, a Central Processing Unit (CPU), an application-specific integrated circuit (ASIC), a digital signal processor (DSP), a digital signal processing device (DSPD), a programmable logic device (PLD), a field programmable gate array (FPGA), a controller, an accelerator, a microcontroller, a microprocessor or other electronic elements. Processor 131 is coupled to input device 130 and output device 132 by a wired or wireless connection.

In some embodiments, input device 130 can include a variety of input devices, for example, can include at least one of a user-oriented user interface, a device-oriented device interface, a software programmable interface, a camera, and a sensor. In some embodiments, the device-oriented device interface can be a wired interface for data transmission between devices, or a hardware insert interface (such as a USB interface or a serial port) for data transmission between the devices. In some embodiments, the user-oriented user interface can be, for example, a user-oriented control key, a voice input device configured to receive a voice input, and a touch sensing device for a user to receive a user touch input (such as a touch screen or a touch pad with a touch sensing function). In some embodiments, the software programmable interface can be, for example, an entry for the user to edit or modify a program, for example, an input pin interface or input interface of a chip. In some embodiments, the transceiver can be a radio frequency transceiver chip with a communication function, a baseband processing chip, a transmitting and receiving antenna, and so on. An audio input device such as a microphone can receive voice data. Output device 132 can include a display, a sound system and other output devices.

In some embodiments, the processor of the device is configured to execute the functions of the modules of the network management apparatus in each electronic device.

Figure 14:
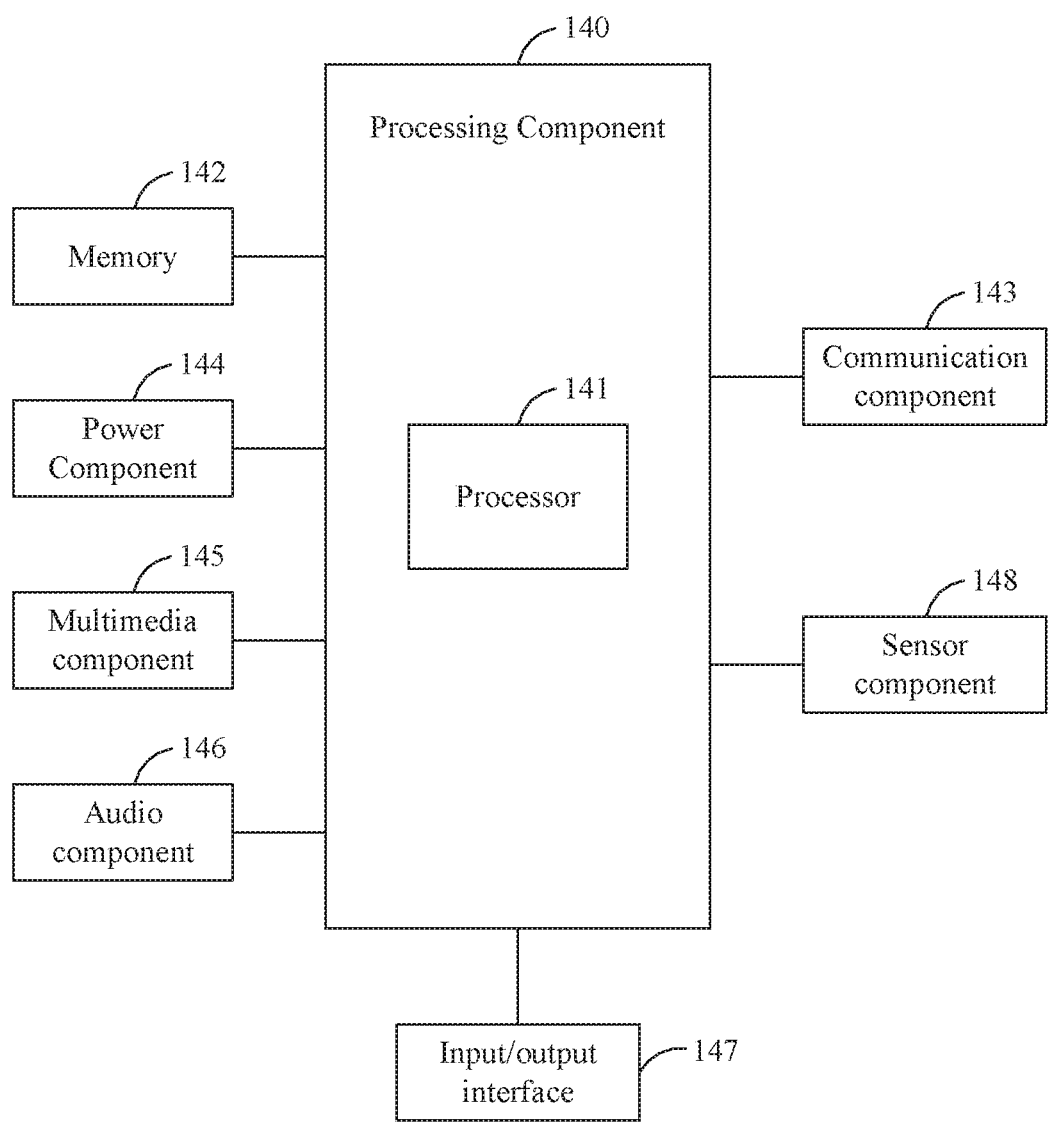
FIG. 14 is a schematic diagram of an exemplary hardware structure of an electronic device, consistent with some embodiments of the present disclosure.

FIG. 14 is a schematic diagram of an exemplary hardware structure of an electronic device consistent with some embodiments of the present disclosure. FIG. 14 is an exemplary implementation of FIG. 13. As shown in FIG. 14, the electronic device includes a processor 141 and a memory 142.

Processor 141 executes computer program codes stored by memory 142 to implement the above-mentioned network management methods.

Memory 142 is configured to store various types of data to support operations in the electronic device. Examples of the data include an instruction of any application or methods for being operated on the electronic device, for example, a message, a picture, and a video. Memory 142 can include a random access memory RAM, and can also include an non-volatile memory NVM, for example, at least one disk memory.

In some embodiments, processor 141 is disposed in a processing component 140. The electronic device can also include: a communication module 143, a power module 144, a multimedia module 145, an audio module 146, an input/output interface 147, and/or a sensor module 148.

Processing component 140 usually controls the overall operation of the device. Processing component 140 can include one or more processors 141 to execute instructions to implement all or part of the steps of the above-mentioned methods. In addition, processing component 140 can include one or more modules to facilitate the interaction between processing component 140 and other components. For example, processing component 140 can include a multimedia module to facilitate the interaction between multimedia component 145 and processing component 140.

Power component 144 supplies power for various components of the device. Power component 144 can include a power management system, one or more power supplies, and other components associated with power generation, management, and distribution for the electronic device.

Multimedia component 145 includes a display screen that provides an output interface between the device and a user. In some embodiments, the display screen can include a liquid crystal display (LCD) and a touch panel (TP). If the display screen includes a TP, the display screen can be implemented as a touch screen to receive an input signal from the user. The TP includes one or more touch sensors to sense a touch, a slide, and a gesture on the TP. The touch sensors not only can sense the boundary of a touch or slide action but also can detect the duration and pressure related to the touch or slide operation.

Audio component 146 is configured to output and/or input an audio signal. For example, audio component 146 includes a microphone (MIC). When the device is in an operating mode, such as a speech recognition mode, the MIC is configured to receive an external audio signal. The received audio signal can be further stored in memory 142 or sent by using communication component 143. In some embodiments, audio component 146 further includes a loudspeaker configured to output an audio signal.

Input/output interface 147 provides an interface between processing component 140 and a peripheral interface module. The peripheral interface module can be a click wheel, buttons, and the like. The buttons can include, but are not limited to, a volume button, a start button, and a lock button.

Sensor component 148 includes one or more sensors configured to provide state evaluation of various aspects for the device. For example, sensor component 148 can detect an on/off state of the device, relative positioning of components, and whether or not a user is in contact with the device. Sensor component 148 can include a proximity sensor configured to detect the presence of an object nearby without any physical contact, including detecting a distance between the user and the device. In some embodiments, the sensor component 148 can further include a camera, and the like.

Communication component 143 is configured to facilitate wired or wireless communication between the electronic device and other electronic devices. The electronic device can be connected to a wireless network based on a communications standard, for example, WiFi, 2G, 3G, or a combination thereof. In an embodiment, the electronic device can include an SIM card slot for inserting an SIM card, so that the device can log in to a GPRS network and establish communication with the server via the Internet.

As can be seen from the above, communication component 143, audio component 146, input/output interface 147, and sensor component 148 involved in the embodiment of FIG. 14 can all be used as the implementation manners of the input device in the embodiment of FIG. 13.

A terminal device is provided in embodiments of this disclosure, including: one or more processors; and one or more machine readable media with instructions stored thereon, wherein when executed by the one or more processors, the instructions cause the terminal device to perform one or more of the methods as described in some embodiments of the present disclosure.

A server is further provided according to some embodiments of the present disclosure, including: one or more processors; and one or more machine readable media with instructions stored thereon, wherein when executed by the one or more processors, the instructions cause the server to perform one or more of the methods as described in the embodiments of the present disclosure.

A gateway device is further provided according to some embodiments of the present disclosure, including: one or more processors; and one or more machine readable media with instructions stored thereon, wherein when executed by the one or more processors, the instructions cause the gateway device to perform one or more of the methods as described in the embodiments of this disclosure.

The embodiments of the present disclosure are described with reference to flowcharts and/or block diagrams of the method, the terminal device (system) and the computer program product. It should be understood that a computer program instruction can be used to implement each process and/or block in the flowcharts and/or block diagrams and combinations of processes and/or blocks in the flowcharts and/or block diagrams. The computer program instructions can be provided to a general-purpose computer, a special-purpose computer, an embedded processor or a processor of another programmable data processing terminal device to generate a machine, such that the computer or the processor of another programmable data processing terminal device executes an instruction to generate an apparatus configured to implement functions designated in one or more processes in a flowchart and/or one or more blocks in a block diagram.

The computer program instructions can also be stored in a computer readable storage that can guide the computer or another programmable data processing terminal device to work in a specific manner, such that the instruction stored in the computer readable storage generates an article of manufacture including an instruction apparatus, and the instruction apparatus implements functions designated by one or more processes in a flowchart and/or one or more blocks in a block diagram.

The computer program instructions can also be loaded into the computer or another programmable data processing terminal device, such that a series of operation steps are executed on the computer or another programmable terminal device to generate a computer implemented processing, and therefore, the instruction executed in the computer or another programmable terminal device provides steps for implementing functions designated in one or more processes in a flowchart and/or one or more blocks in a block diagram.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the database may include A, or B, or C, or A and B, or A and C, or B and C, or A and B and C.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

Finally, it should be further noted that in this text, the relation terms such as "first" and "second" are merely used to distinguish one entity or operation from another entity or operation, and do not require or imply that the entities or operations have this actual relation or order. Moreover, the terms "include," "comprise" or any other variations thereof are intended to cover non-exclusive inclusion, so that a process, method, article or terminal device including a series of elements not only includes the elements, but also includes other elements not clearly listed, or further includes elements inherent to the process, method, article or terminal device. In the absence of more limitations, an element defined by "including a/an . . . " does not exclude that the process, method, article or terminal device including the element further has other identical elements.

What is claimed is:

1. A network management method comprising:
    connecting by a first terminal device to an existing network system through a connection mode;
    after the first terminal device being connected to the existing network system, acquiring by the first terminal device management configuration information corresponding to the existing network system, wherein the existing network system includes a plurality of terminal devices that are interconnected using at least two different connection modes to form the existing network system, and the plurality of terminal devices are connected with a first interface that is not used for conveying business load;
    identifying, by the first terminal device, a second terminal device by scanning through the connection mode, to establish a connection to the second terminal device;
    sending, by the first terminal device, an authentication request to a first server via the second terminal device, wherein the authentication request causes the first server to form a new network system that includes at least the first and second terminal devices, the new network system being configured to convey, via the first interface, management information to at least the first and second terminal devices; and
    acquiring, by the first terminal device, management configuration information corresponding to the new network system.

2. The method of claim 1, wherein connecting, by the first terminal device, to the existing network system through the connection mode comprises:
    identifying, by the first terminal device, a third terminal device by scanning through the connection mode, to establish a connection to the third terminal device; and
    connecting to the existing network system corresponding to the third terminal device.

3. The method of claim 1, further comprising:
    prior to connecting to the existing network system, sending, by the first terminal device, authentication information to a second server that is connected to the third terminal device for authentication.

4. The method of claim 3, wherein sending, by the first terminal device, authentication information to the second server for authentication comprises:
    determining device information of the first terminal device according to encryption information, wherein the encryption information comprises at least one of a certificate or a key; and
    sending the device information of the first terminal device to the second server for authentication via the third terminal device connected with the second server.

5. The method of claim 1, further comprising:
    sending, by the first terminal device, a data request to the first server for subscribing to service information according to the data request.

6. The method of claim 1, wherein data between the first terminal device and the first server is transferred through a gateway device.

7. The method of claim 6, wherein the gateway device comprises the first interface and a second interface, the first interface is configured to be connected to the existing network system, and the second interface is configured to be connected to a service network.

8. A first terminal device comprising:
    a memory storing a set of instructions; and
    one or more processors configured to execute the set of instruction to cause the first terminal device to perform:
        connecting to an existing network system through a connection mode,
        after connecting to the existing network system, acquiring management configuration information of the existing network system, wherein the existing network system includes a plurality of terminal devices that are interconnected using at least two different connection modes to form the existing network system, and the plurality of terminal devices are connected with a first interface that is not used for conveying business load,
        identifying a second terminal device by scanning through the connection mode, to establish a connection to the second terminal device,
        sending an authentication request to a first server via the second terminal device, wherein the authentication request causes the first server to form a new network system that includes at least the first and second terminal devices, the new network system being configured to convey, via the first interface, management information to at least the first and second terminal devices, and acquiring management configuration information corresponding to the new network system.

9. The first terminal device of claim 8, wherein connecting to the existing network system through a connection mode comprises:

identifying a third terminal device by scanning through the connection mode to establish a connection to the third terminal device; and connecting to the existing network system corresponding to the third terminal device.

10. The first terminal device of claim 8, wherein the set of instructions that are executable by one or more processor of the first terminal device to cause the first terminal device to further perform:

sending authentication information to a second server that is connected to the third terminal device for authentication.

11. The first terminal device of claim 8, wherein the connection mode comprises at least one of the following: Wi-Fi, Bluetooth, Zigbee, or long-range low-power data transmission (LoRa).

12. The first terminal device of claim 10, wherein sending authentication information to the second server that is connected to the third terminal device for authentication comprises:

determining device information of the first terminal device according to encryption information, wherein the encryption information comprises at least one of a certificate or a key; and sending the device information of the first terminal device to the second server for authentication via the third terminal device connected with the second server.

13. The first terminal device of claim 8, wherein the set of instructions that are executable by one or more processor of the first terminal device to cause the first terminal device to further perform:

sending a data request to the first server for subscribing to service information according to the data request.

14. The first terminal device of claim 8, wherein data between the first terminal device and the first server is transferred through a gateway device.

15. The first terminal device of claim 14, wherein the gateway device comprises the first interface and a second interface, the first interface is configured to be connected to the new network system, and the second interface is configured to be connected to a service network.

16. A non-transitory computer readable medium that stores a set of instructions that is executable by at least one processor of a first terminal device to cause the first terminal device to perform a network management method, the method comprising:

connecting to an existing network system through a connection mode; and after the first terminal device being connected to the existing network system, acquiring management configuration information corresponding to the existing network system, wherein the existing network system includes a plurality of terminal devices that are interconnected using at least two different connection modes to form the existing network system, and the plurality of terminal devices are connected with a first interface that is not used for conveying business load;

identifying a second terminal device by scanning through the connection mode, to establish a connection to the second terminal device;

sending an authentication request to a first server via the second terminal device, wherein the authentication request causes the first server to form a new network system that includes at least the first and second terminal devices, the new network system being configured to convey, via the first interface, management information to at least the first and second terminal devices; and acquiring management configuration information corresponding to the new network system.

* * * * *